United States Patent
Viol et al.

(10) Patent No.: US 10,380,191 B2
(45) Date of Patent: Aug. 13, 2019

(54) ADAPTABLE APPLICATION VARIANTS

(71) Applicant: SAP SE, Walldorf (DE)

(72) Inventors: Markus Viol, Walldorf (DE);
Alexander Rauh, Weinheim (DE);
Carsten Brandt, Mannheim (DE); Lars Erbe, Stutensee (DE); Stefan Haffner, Hockenheim (DE); Felix Riegger, Mannheim (DE); Axel Warner, Maxdorf (DE); Christian Voshage, Eppelheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/416,814

(22) Filed: Jan. 26, 2017

(65) Prior Publication Data
US 2018/0210869 A1     Jul. 26, 2018

(51) Int. Cl.
*G06F 16/903* (2019.01)

(52) U.S. Cl.
CPC .............................. *G06F 16/90335* (2019.01)

(58) Field of Classification Search
CPC .................................................... G06F 17/243
USPC .................................................... 717/121
See application file for complete search history.

(56) References Cited

U.S. PATENT DOCUMENTS

| 7,509,638 | B2* | 3/2009 | Backhouse | G06F 8/60 717/176 |
| 7,600,234 | B2* | 10/2009 | Dobrowski | H04L 29/06 700/97 |
| 8,463,822 | B2* | 6/2013 | Li | G06F 9/5027 707/802 |
| 8,752,015 | B2* | 6/2014 | Basak | G06F 9/44505 717/120 |
| 8,898,556 | B2* | 11/2014 | Grosz | G06F 17/3028 715/205 |
| 8,959,053 | B2* | 2/2015 | Grinshpun | H04L 41/0846 707/634 |
| 9,052,820 | B2* | 6/2015 | Jarrett | G06F 3/04883 |

(Continued)

OTHER PUBLICATIONS

"System-Level Support for Composition of Applications"; Brian Kocoloski, John Lange, Hasan Abbasi, David E. Bernholdt Terry R. Jones, Jai Dayal, Noah Evans, Michael Lang, Jay Lofstead, Kevin Pedretti, Patrick G. Bridges—ROSS '15, Jun. 16, 2015, Portland, Oregon, USA.*

*Primary Examiner* — Francisco J Aponte
(74) *Attorney, Agent, or Firm* — Sterne, Kessler, Goldstein & Fox P.L.L.C.

(57) ABSTRACT

Disclosed herein are system, method, and computer program product embodiments for managing and accessing variants of applications. In an embodiment, a request for an application including one or more contextual parameters may be received. A base user interface configuration corresponding to the application may first be retrieved. One or more interface configuration files corresponding to the one or more contextual parameters may then be retrieved from a layered repository. The layered repository may be partitioned into organizational layers that store a plurality of interface configuration files associated with the application. The retrieved interface configuration files may be merged with the base user interface configuration to generate a composite interface configuration, and the composite interface configuration may be applied to the application at runtime.

20 Claims, 10 Drawing Sheets

(56) References Cited

U.S. PATENT DOCUMENTS

| | | | |
|---|---|---|---|
| 9,423,954 B2* | 8/2016 | Morris | G06F 3/0484 |
| 9,575,774 B2* | 2/2017 | Clark | G06F 9/445 |
| 9,674,335 B2* | 6/2017 | Chen | G06F 1/1669 |
| 9,696,888 B2* | 7/2017 | Deutsch | G06F 3/0481 |
| 2008/0005380 A1* | 1/2008 | Kawasaki | G06F 11/1458 |
| | | | 710/15 |
| 2009/0124374 A1* | 5/2009 | Patel | G07F 17/32 |
| | | | 463/29 |
| 2010/0184512 A1* | 7/2010 | Evans | A63F 13/12 |
| | | | 463/31 |
| 2011/0237329 A1* | 9/2011 | Evans | A63F 13/12 |
| | | | 463/30 |
| 2012/0166954 A1* | 6/2012 | Roth | G06F 17/3002 |
| | | | 715/730 |
| 2012/0173339 A1* | 7/2012 | Flynt | G06F 3/0481 |
| | | | 705/14.58 |
| 2013/0047117 A1* | 2/2013 | Deutsch | G06F 3/0481 |
| | | | 715/781 |
| 2013/0057588 A1* | 3/2013 | Leonard | G06F 3/0488 |
| | | | 345/660 |
| 2013/0063442 A1* | 3/2013 | Zaman | G06T 11/40 |
| | | | 345/441 |
| 2013/0063443 A1* | 3/2013 | Garside | G06T 15/005 |
| | | | 345/473 |
| 2013/0063465 A1* | 3/2013 | Zaman | G06F 3/04883 |
| | | | 345/582 |
| 2013/0067381 A1* | 3/2013 | Yalovsky | G06F 11/321 |
| | | | 715/772 |
| 2013/0117424 A1* | 5/2013 | Colyer | G06F 9/44505 |
| | | | 709/221 |
| 2013/0227476 A1* | 8/2013 | Frey | G06F 3/0488 |
| | | | 715/810 |
| 2014/0089856 A1* | 3/2014 | Matthews | G06F 17/30899 |
| | | | 715/835 |
| 2014/0201621 A1* | 7/2014 | Fleishman | H04N 7/163 |
| | | | 715/234 |
| 2014/0331147 A1* | 11/2014 | Jain | G06F 3/0484 |
| | | | 715/745 |
| 2015/0040099 A1* | 2/2015 | Mall | H04L 41/082 |
| | | | 717/107 |
| 2015/0040104 A1* | 2/2015 | Mall | H04L 41/082 |
| | | | 717/121 |
| 2015/0089377 A1* | 3/2015 | Dasgupta | G06F 17/30899 |
| | | | 715/738 |
| 2015/0113476 A1* | 4/2015 | Deutsch | G06F 3/0481 |
| | | | 715/799 |
| 2015/0242430 A1* | 8/2015 | Chen | G06F 3/04817 |
| | | | 707/693 |
| 2015/0381687 A1* | 12/2015 | Lam | H04L 65/602 |
| | | | 709/246 |
| 2016/0026371 A1* | 1/2016 | Lu | G06F 3/04845 |
| | | | 715/765 |
| 2016/0139737 A1* | 5/2016 | Conn | G06F 3/0482 |
| | | | 715/802 |
| 2017/0076348 A1* | 3/2017 | Jennings | G06Q 30/0621 |

\* cited by examiner

| Tile Type | Brief Description | Example |
|---|---|---|
| KPI | Measure/monitor key operating metrics. | -99.99 |
| Comparison Chart | Visual comparison between different values. | Comparative Annual Totals<br>Americas 134M<br>APAC 97M<br>EMEA 234M<br>APA 187 123M |
| Bullet Chart | Comparing a single value to one or more target values. | Cumulative Totals / Cumulative Totals / Cumulative Totals |
| Trend Chart | Accumulated totals over time. | Incoming Customer Complaints / Comparative Annual Totals |

FIG. 3A

| Tile Type | Brief Description | Example | | |
|---|---|---|---|---|
| Bar Chart (350) | Visual comparison between different values. | Receivables Aging / Overdue and due | Receivables Aging / Overdue and due | Receivables Aging / Overdue and due |
| Launch (360) | Identifying a resource (by title and an icon) that may be launched. | My Travel Expenses / By Quarter | Financial Statement / Optional Footer | |
| Monitoring (370) | Current status of an object. | Approve Travel Request / ✈ 35 / Leave Requests | | |

FIG. 3B

ADAPTABLE APPLICATION VARIANTS

CROSS-REFERENCE TO RELATED APPLICATIONS

The present application is related to U.S. patent application Ser. No. 15/416,582, titled "Tile Interface and Launchpad System," filed on Jan. 26, 2017, which is incorporated herein by reference in its entirety.

BACKGROUND

Applications and user interfaces are often adapted to meet the needs of different users in different industries, locales, companies, and other contexts. This often requires application vendors to develop and maintain multiple versions of applications, employing teams of developers to ensure consistency and proper function across all versions. When updates to the core application or application dependencies are needed, changes must be propagated to each application version and properly tested, often leading to high maintenance costs during the lifecycle of an application.

BRIEF DESCRIPTION OF THE DRAWINGS

The accompanying drawings are incorporated herein and form a part of the specification.

FIGS. 3A and 3B are block diagrams of example tiles according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a tile interface and launch pad system enabling access to various applications and variants thereof.

Figure 1:
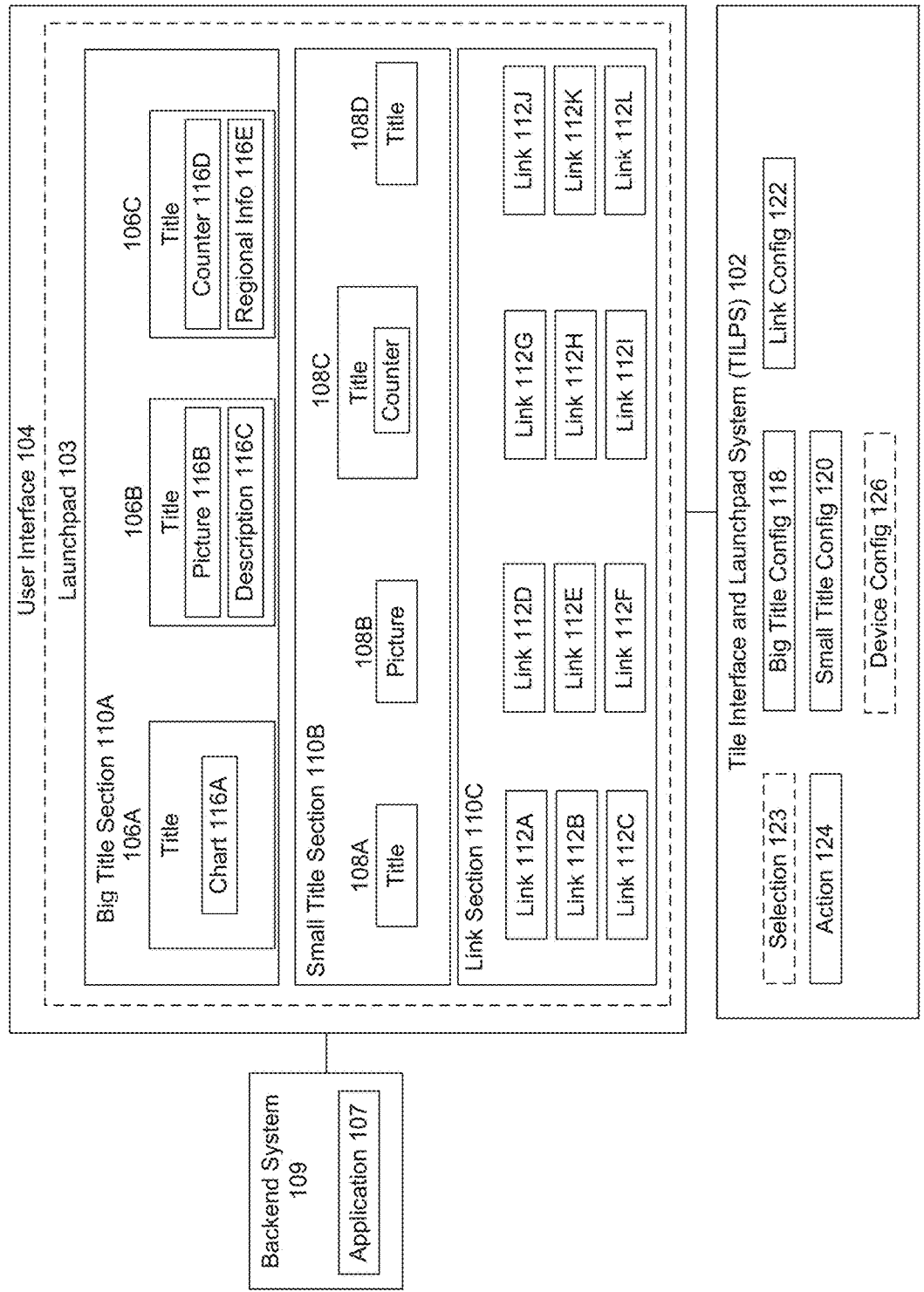
FIG. 1 is a block diagram of a tile interface and launch pad system (TILPS), according to some embodiments.

The display area of a user interface is valuable real estate. Too many items and/or too much information displayed in a user interface can clog the user interface and make it virtually unusable or inefficient for a user. Meanwhile too little information, or information irrelevant to a particular user, can waste valuable display space real estate. FIG. 1 is a block diagram 100 of a tile interface and launch pad system (TILPS) 102 that addresses these concerns and challenges, according to some embodiments.

TILPS 102 increases (or even maximizes) the display area of a user interface by varying the size of different display items. Also, TILPS 102 allows Launchpad 103 to be customized and configured on a per-user and/or per-device basis, which may be valuable because different users will often value different display items and information differently. TILPS 102 allows for flexibility in deciding which items are displayed on Launchpad 103, how much information about each item is displayed, where that information is displayed, and is configurable on a per-user and/or per-device basis. In an embodiment, TILPS 102 may use the settings or preferences of a particular user and provide comparable uniformity across different numbers of devices the user may use to access a system providing user interface 104, or across different users who may perform similar roles across an organization.

User interface 104 may correspond to a display area of a device. Different devices, such as mobile phones, laptops, touchpads, desktops, etc., may have different sized user interfaces 104. Within user interface 104, TILPS 102 may generate or provide Launchpad 103. Launchpad 103 may be a home screen that provides access to another system 109 or set of applications 107 to which a user has access. For example, Launchpad 103 may be the home screen for how employees of an organization log in and access different applications that are relevant to the employees performing their particular roles within the organization.

Launchpad 103 may be accessed by employees or other users across a variety of different devices, such as laptop computers, touch screen devices, mobile phones, etc. Different employees, particularly in different organizational roles, may access or be granted access to different applications or information they may use to perform their duties. TILPS 102 provides functionality that makes Launchpad 103 adaptable to meet the individual needs of the various users who may be accessing Launchpad 103 from different devices, maximizing the real estate of the display area of user interface 104 regardless from which device Launchpad 103 is being accessed while providing each user the most relevant information to that user.

Launchpad 103 may include various display elements. The various display elements or display items on Launchpad 103 may be big tiles 106 (or more generally first tiles 106), small tiles 108 (or more generally second tiles 108, where the second tiles 108 are smaller than the first tiles 106 in some embodiments), and links 112. Tiles 106, 108 may be containers or visual representations of an application 107 of a backend system 109 that is accessible via Launchpad 103. In an embodiment, a tile 106, 108 may be a visual representation that provides user-relevant information about a particular application 107 associated with the tile. For example, the information may include a name of the application, a summary of what the application is used for, and/or data retrieved from or accessed by the application, to name just a few examples. Then, for example, a user may select the tile 106, 108 to perform an action such as either updating or expanding on the data or launching the application 107.

Backend system 109 may be one more servers that host provide the functionality for one or more applications 107 represented by tiles 106, 108 and/or links 112. In an embodiment, backend system 109 may be remote from or wirelessly networked to a device operating user interface 104. In an embodiment, TILPS 102 may operate on a backend system 109 and provide relevant information to display Launchpad 103 on a mobile or other device with user interface 104.

Backend system 109 may include a database that provides data accessible to a user and/or application 107. In an embodiment, backend system 109 may provide functionality and resources enabling a user to launch or operate application 107. In different embodiments, a particular Launchpad 103 may serve as the gateway or interface to multiple backend systems 109, which may or may not directly or indirectly communicate with one another. For example, different applications 107 accessible from Launchpad 103 may be provided by different companies, creators, or organizations.

As noted above, in some embodiments, tiles 106, 108 may be visual containers that represent applications 107 operating across one or more backend systems 109. The different tiles 106, 108 may include information about or from the corresponding application(s) 107 that a particular user may find useful. Such information may include a name or title of the application, a state of the application or data on which the application executes, or other information. This information may be selectable or customizable on a per-user, per-user role, per-organization, and/or per-device (e.g., user interface 104 size) basis. In an embodiment, each tile 106, 108 may represent a single application 107, or a particular application 107 may be represented by multiple tiles 106, 108, where each tile provides access to different functionality or data of or associated with the application 107.

Which information is displayed and how that information is displayed via tiles 106, 108 may vary based on what is relevant to a particular user or a user in a particular role or performing a particular task. For example, a particular backend system 109 may include hundreds or even thousands of applications 107 or functions. However, not all of the applications 107 may be relevant to each user. For example, different users may not be able to access all the applications 107 based on their roles within an organization or clearance level. In an embodiment, TILPs 102 may determine a role of a user and provide only those applications 107 that are relevant or accessible to a user. Each user may then customize or configure Launchpad 103 by selecting a subset of the available applications 107 that are most relevant to the individual user, thus maximizing available screen real estate.

In an embodiment, as noted above, user interface 104 may include both big tiles 106 and small tiles 108. One of the differences between big tiles 106 and small tiles 108 is that big tiles 106 may include and display more information about an application 107 than small tiles 108. However, correspondingly big tiles 106 may take up more of the user interface 104 or display screen real estate than small tiles 108. Thus a user may decide which applications 107 are represented by big tiles 106 and small tiles 108 based on whatever applications and information are most relevant to the user. TILPS 102 may then provide Launchpad 103 based on the user's desired configuration.

In an embodiment, Launchpad 103 may include both a big tile section 110A and a small tile section 110B. Launchpad 103 may also include a link section 110C which may include links 112 that may be smaller visual indicators that may link or activate applications 107 when selected (but which may not provide additional data which may be provided via big tiles 106 or small tiles 108 as described in greater detail below). In an embodiment, a link 112 may be text only, or otherwise limited in how much information may be displayed. By limiting the type and/or amount of information available via links 112, TILPS 102 may reduce or minimize the required screen real estate necessary to display links 112 and increase or maximize the display area of user interface 104. By providing different sizes of visual indicators (big tiles 106, small tiles 108, links 112), TILPS 102 efficiently utilizes the available user interface 104 display area by providing the most relevant data and information to the user and enabling information to be displayed that may otherwise not be displayable were a single icon size to be used across all the different applications.

Three example big tiles 106A, 106B, and 106C are shown in big tile section 110A of the example of FIG. 1. Each big tile 106 includes a title 114. Title 114 may be a name or short descriptor as to what application 107 is associated or linked with a particular tile. Title 114 may be the actual name of the application as received from the application 107 (or metadata), or may be provided by user to describe the application 107. For example, an application may be called the Time Entry and Tracking System, but a user may provide a title 114 such as "Time Card."

Big tiles 106 may also include additional information 116 that may be displayed via Launchpad 103. Additional information 116 may include any information that is relevant to a user accessing the system and may be provided by the associated application. Examples of additional information 116 include charts, pictures/icons, screen shots, application or data state information, descriptions, counters, and regional information. Other embodiments may include any different type of information that may be displayed in big tiles 106. Other examples of additional information 116 are provided in FIG. 3, as discussed below.

Each big tile 106 may be rendered by TILPS 102 based on a big tile configuration 118. Big tile config 118 may allow a user to decide which information is to be displayed in a big tile 106 for an application or group of applications 107. For example, a particular application 107 may have metadata that indicates which information or data is available for display via Launchpad 103. Then, for example, a user or system administrator may select or customize which data or information is actually displayed across one or more tiles 106, 108 corresponding to the application 107. The various choices of information may include title 114, charts 116A, pictures 116B, description 116C, counters 116D, regional information 116E or any other information.

Big tile config 118 may be used on a per-application, per-tile, and/or per-device basis, or may be applied to a group of applications 107. In an embodiment, a user may select several different applications and customize big tile config 118 to be applied to each application 107 of the group. For example, each big tile 106 of a particular group of applications 107 may include the application title 114 and a counter 116D relevant to each individual application 107. Or, for example, different applications 107 may be grouped based on a particular user's or a group of users' different roles.

In an embodiment, an application 107 may track stock market investments. Via big tile configuration 118, a user may configure the stock tracker to display the prices of one or two selected stocks from the portfolio (e.g., such as the big movers for the day, the stocks that comprise the greatest portion of the portfolio, the smallest cap stocks, etc.). Or, for example, big tile configuration 118 may indicate that a performance chart 116A that tracks or displays the performance of the portfolio over the previous week or month or other time period.

In an embodiment, the stock market application 107 may be represented by two tiles 106, a first big tile 106 corresponding to a first portfolio or investment and a second big tile 106 (or one or more small tiles 108) corresponding to a second portfolio or investment. Then, for example, if a user selects a particular tile 106, 108 the data in the corresponding tile 106 may be updated (or may be continually updated in real-time), or the application may launch directly to the corresponding investment or portfolio so that the user may take whatever actions (e.g., trades) that the user desires.

In an embodiment, a big tile 106 may provide certain functionality (e.g., such as buy or sell shares of an investment) directly from Launchpad 103. For example, a particular big tile 106 may represent a particular investment. Then, for example, a user may select buy/sell and enter a number of shares directly into big tile 106. This information may then be passed to backend system 109 to perform the desired function via application 107.

In another example, if an application 107 performs functions with regard to sales, then the big tile 106 may include information about the best/worst performing sales regions, or a map of which sales areas are covered. In different embodiments, different users may select different information to be displayed via big tiles 106.

Similarly, TILPS 102 may use small tile configuration 120 to determine which information is to be displayed with respect to each of the various small tiles 108. Small tiles 108 may include any information that may be included in big tiles 106. However, the display area or amount of information that is available to small tiles 108 may be less than that of big tiles 106. Thus, either less information may be displayed in small tiles 108, or the information provided must be smaller (e.g., smaller text). However, beyond a certain point the text may be unreadable at which point the amount of information may be limited. In an embodiment, based on size of user interface 104 or display device, TILPS 102 may determine a maximum amount of information (or another amount less than the maximum) that may be displayed via big tiles 106, small tiles 108, and links 112.

TILPS 102 may also include a link configuration 122. Link configuration 122 may indicate which information is to be included in or as a link 112. Link configuration 122 may indicate what action 124 happens when the link is clicked (e.g., which page or screen of the application is loaded), and what text is used to represent the link on user interface 104. Links 112 may use even less space or otherwise be more limited in the types of information available than small tiles 108.

By providing various tile-types or sections 110A, 110B, 110C, TILPS 102 allows Launchpad 103 to be customized and increases (or even maximizes) the available user interface 104 area. This customization may be done on a per-user, per user-group, and/or per-device basis. In an embodiment, different applications 107 may not all provide valuable enough data or other functionality to justify the corresponding space required by big tiles 106. Thus, based on the available application 107 data and user preferences, Launchpad 103 may provide different sized display items (106, 108, 112).

For example, as shown in FIG. 1, in some embodiments, only three big tiles 106 may be able to fit on user interface in a particular row. However, in the same screen width (and with a reduced height), four small tiles 108 may fit. Further, twelve links 112 may fit in similar display area. The examples shown are merely exemplary, and in different embodiments, or across different screen sizes, different numbers of display items (106, 108, and 112) may be displayed.

Links 112 may be used for applications which are of lower priority, used less often, or that may not have data available so as to justify the use of extra screen space required for a big tile 106 or small 108. For example, certain older or legacy or transactional applications may not have data or information that is accessible via Launchpad 103. As such, those applications 107 may be represented by links 112.

The division of Launchpad 103 into discrete sections 110A, 110B, and 110C based on the size or amount of information as shown is exemplary only. In an embodiment, a first (topmost or leftmost) section of Launchpad 103 may include tiles 106, 108 and/or links 112 that a particular user uses most often, or that correspond to a particular ongoing project on which the user is working.

For different applications 107, which may be of equal importance to a user, TILPS 102 may allow the user to configure how much information is immediately accessible via Launchpad 103 based on what's available via the application 107 and/or helpful or relevant to the user. As such, a first section 110A may include a combination of big tiles 106, small tiles 108, and links 112 which may be arranged in such a way as to maximize the available user interface 104 display area. Tile or application grouping may also be performed in a nested, stacked, or hierarchical manner.

In an embodiment, TILPS 102 may allow a user to simply drag and drop tiles 106, 108 and links 112 to different sections 110A-C of user interface 104 to change what information and how that information is displayed on user interface 104. Or, for example, a user may select from a menu option (e.g., right-click function) how much information or which information the user wants displayed about a particular application (e.g., big tile config 118, small tile config 120, or link config 122).

In an embodiment, TILPS 102 may receive a selection 123 of a particular display item (106, 108, or 112) from Launchpad 103. Selection 123 may indicate an intent to move the item or change the amount of type of information that is being displayed. In an embodiment, selection 123 may be a drag command (followed by a drop confirmation) between different sections 110A, 110B, 110C. Upon receiving the drop command, TILPS 102 may display the corresponding display item in accordance to the parameters provided in the corresponding configuration 118, 120, 122.

The configurations 118, 120, 122 may also indicate what action 124 is to be performed upon a selection (e.g., mouse click or other selection) of the display items. Different actions 124 may include updating or changing the displayed content or information, or launching the application 107.

Figure 2:
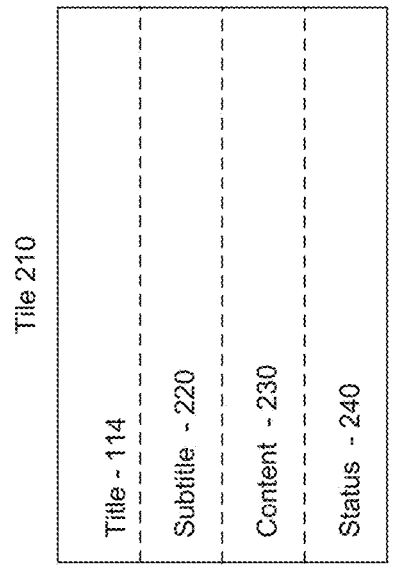
FIG. 2 is an example structure of a tile, according to some embodiments.

FIG. 2 is an example structure of a tile 210, according to an embodiment. Depending on whether the tile 210 is a big tile 106, or a small tile 108, the amount of information that can be displayed in the tile 210 may vary. In an embodiment, big tiles 106 may be of a first uniform size and small tiles 108 may be of a second uniform size.

In another embodiment, different big tiles 106 may vary in size from one another depending on which information is selected for display. However, the size may be limited by a minimum size (e.g., that is greater than or equal to a maximum small tile 108 size) and/or a maximum size (e.g., to ensure no one tile consumes too much user interface 104 screen real estate). Similarly, small tiles 108 may be capped on how large they can be (e.g., so that they are smaller than the smallest allowable big tile 106) and how small they can be (e.g., ensuring they are distinguishable from links). Then, for example, based on which information the user selects for big tile config 118 or small tile config 120 the tiles may be presented within their allowable ranges.

Tile 210 is an example structure of how a big tile 106 and/or small tile 108 may be presented or displayed in Launchpad 103. Title 114 may be a name (user or application provided) or other descriptor that identifies the application 107. In an embodiment, title 114 may be an icon, picture, or symbol that represents an application 107 or functionality.

Subtitle 220 may be a short descriptor that further describes the functionality or data represented by the tile 210. For example, if a particular tile 210 includes a past state a sales number for a previous span of time (such as sales for March 2016), then subtitle may indicate the span of time, giving context to the data. Or, for example, subtitle 220 may provide information as to which functionality the tile 220 links (e.g., calculator, time entry, client contact information, etc.).

Content 230 may include data retrieved from or functionality that may be performed the application 107 that may be relevant to a user. For example, if the tile 210 represents a sports application, content 230 may include the score of a particular game (e.g., which may be ongoing and updated in real-time, may have been previously played, or may be upcoming and thus may indicate the start time and location). The functionality, may include, for example, a request to update the score. In an embodiment, a user may decide which content (if any) the user wants displayed in tile 210 and the form in which the content is displayed (e.g., text, picture, chart, etc.).

Status 240 may be a status of the application 107, the performance of a function, or data. Status 240 may indicate whether an application 107 or data is accessible, is being updated, or whether the machine or backend 109 is down or unreachable. In an embodiment, status 240 may indicate to a user whether a particular action is required. For example, status 240 may indicate that a user needs to provide information to the system or take a particular action (e.g., such as contact a particular client).

In an embodiment, status 240 may indicate that a particular event has occurred or scheduled to occur at a particular time. For example, status 240 may indicate that a product has reached a certain price, a sales order has been received, or a sale is set to take place at 3:00 pm. In an embodiment, status 240 may be displayed differently based on a priority of the status 240. For example, urgent or important status items may be enlarged or displayed in red, bold, or flashing, while less urgent items may be displayed in amber or green or of regular size.

In an embodiment, a user may be operating a particular application 107 and may choose to save the state of the application in a tile 106, 108. Then, for example, content 230 may indicate a state of the application or data when it was saved, and status 240 may indicate when the data state was saved.

FIGS. 3A and 3B are block diagrams of example tiles 210 according to some embodiments. 310 is an example of a key performance indicator (KPI) that may be included in a tile 210. Tile 210 is used herein to refer to tiles generally and may refer to big tiles 106 and/or small tiles 108. KPI 310 may measure or monitor key performance metrics associated with or related to an application. In the example shown the profit margin of a particular region may be shown, and the tile may indicate whether the margin has increased or decreased. Showing such information may help provide the user with valuable or useful information and prevent the user from having to open up the application (unless necessary), thus saving time, memory, processing power, and/or computing cycles which may otherwise be consumed by a user activating the underlying application 107. Another example KPI 310 may include the price of a stock, performance of a portfolio, or the latest sales figures across one or more regions.

Tile 320 is an example of a comparison chart, which may be a comparison between different values. For example, comparison chart 320 may compare values across different objects, persons, organizations. Examples may include sales numbers across different teams of sales people or across different regions, or points scored by different players.

Tile 330 is an example of a bullet chart which may compare a single value to one or more target values. For example, bullet chart may compare an accumulated sales total to a sales goal or fundraising goal.

Tile 340 is an example of a trend chart which may include accumulated totals over time. For example, the trend chart 340 may include the performance of an employee, division, or sales of a product over time. In an embodiment, a particular division of an organization may offer multiple product lines and trend chart may capture a summary of how those products performed (e.g., sold) against one another, and how the division itself performed (e.g., with a cumulative total) over a specified period of time. In an embodiment, a selection of a tile may allow a user to adjust the period of time without specifically launching the underlying application 107 providing the data.

Tile 350 is an example of a bar chart that provides a visual comparison between different values. 360 is an example of a launch tile that identifies a resource that may be launched. For example, a launch tile may direct a user to a specific place to access data related to a task or function (such as a financial statement or travel expenses relative to the user). The may limit how much information may need to be loaded into memory, thus saving resources that may otherwise be consumed, and allow the user to more quickly perform the desired function (e.g., accessing or modifying data).

Tile 370 is an example of a monitoring tile. Monitoring tile 370 may monitor and provide status information regarding a pending action item, such a travel, vacation, or reimbursement approval request. Or, for example, monitoring tile 370 may provide real-time updates with regard to flight status, or stock price.

Any of the tiles 310-370 may be provided in a dynamic, static, or at-will manner. In a dynamic manner, certain information may be updated in real-time. For example, if there is high network bandwidth available (e.g., by a laptop or desktop connected to a network) then real-time data may be updated in tiles 310-370. However, if Launchpad 103 is being accessed from a mobile device or area of low bandwidth (e.g., relative to a particular threshold or user-setting), then the data may only be updated periodically or upon request (e.g., at-will via a pull command, for example). Other data provided via tiles 310-370 may include static data, such as data about a particular period in time or screenshot data. While other data may be provided in a hybrid, such that the data will update upon specific request or at-will of a user.

Though the tile information shown in 310-370 is shown as a single piece of information per-tile 210, in different embodiments, a particular tile 210 may include multiple types of tiles 310-370 (e.g., tile information). For example, a single big tile may include both KPI 310 and bullet chart 330 information. Or, for example, information provided in any particular tile 210 may periodically rotate. For example, a tile may toggle between displaying launch information 360 and monitoring information 370 every five seconds. These settings may be provided in big tile config 118 and small tile config 120.

Figure 4:
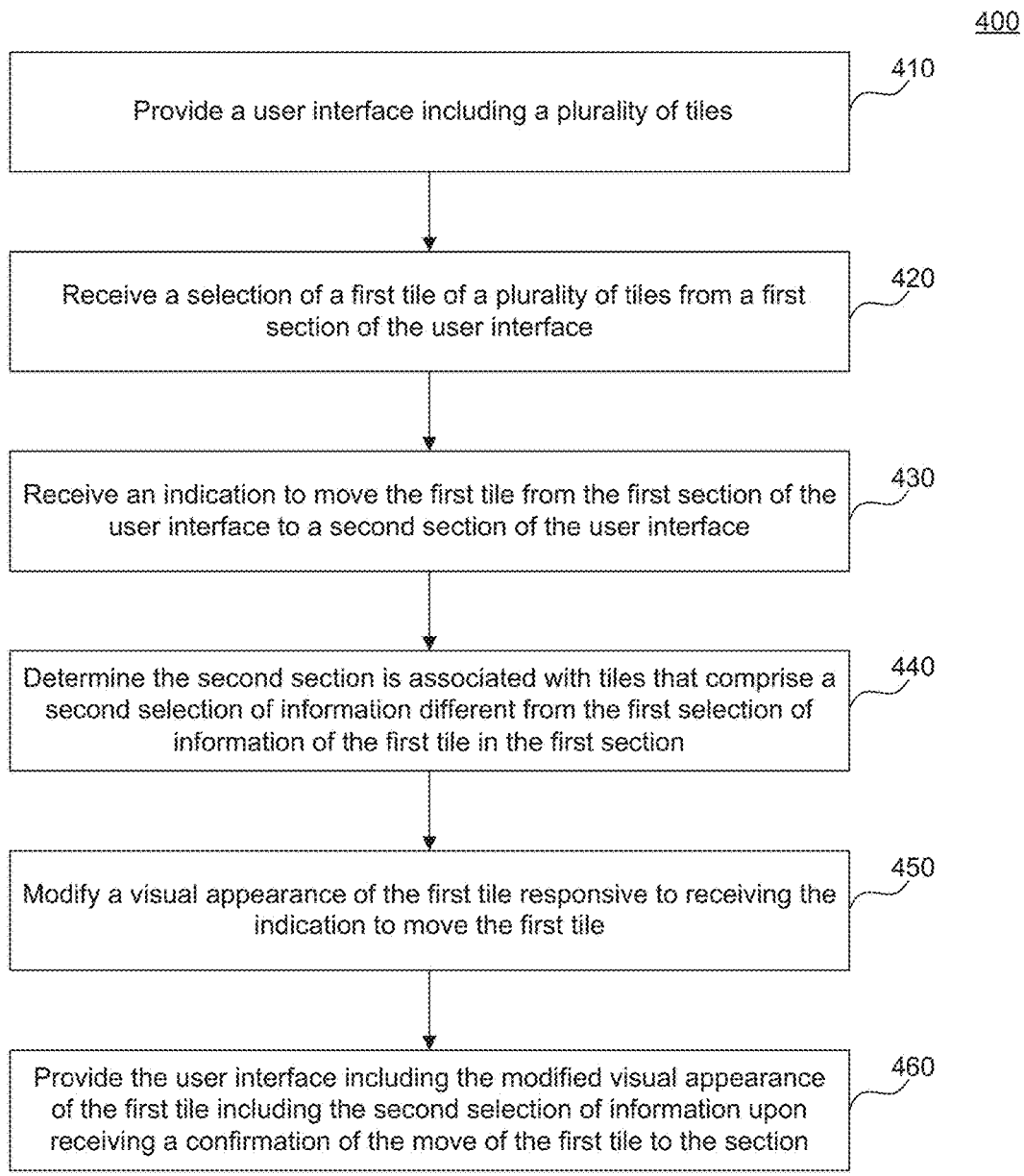
FIG. 4 is a flowchart illustrating a process for the execution of a tile interface and launch pad system, according to some embodiments.

FIG. 4 is a flowchart for a method 400 for a tile interface and Launchpad system, according to an embodiment. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

In 410, a user interface including a plurality of tiles may be provided. For example, TILPS 102 may provide Launchpad 103 via a user interface 104. User interface 104 may be the user interface or display area across any different number of devices. Launchpad 103 may include big tiles 106, small tiles 108, and links 112 that correspond to different applications 107 operating across one or more backend systems 109.

In 420, a selection of a first tile of a plurality of tiles from a first section of the user interface is received. TILPS 102 may receive selection 123 from a user interacting with Launchpad 103. For example, selection 123 may indicate a drag operation on tile 108D that is configured based on small tile config 120.

In 430, an indication to move the first tile from the first section of the user interface to a second section of the user interface is received. In continuing the example above, the user may drag selected tile 108D to big tile section 110A.

In 440, it may be determined that the second section is associated with tiles that comprise a second selection of information different from the first selection of information of the first tile in the first section. For example, TILPS 102 may compare big tile config 118 to small tile config 120 to determine how the visual appearance of a display item changes between big tile section 110A and small tile section 110B. This may also affect how other items are displayed on Launchpad 103. For example, moving an item from small tile section 110B to big tile section 110A may consume greater display screen space than vice versa, and thus fewer items may be displayed on the screen or the existing items may be reconfigured to account for the new big tile 106.

In 450, a visual appearance of the first tile is modified responsive to receiving the indication to move the first tile. For example, upon the drag operation, the user may be provided with a preview of what information or how tile 108D would be displayed as a big tile 106 based on big tile config 118. On the drop or change appearance command, the display item may be displayed with the new properties as indicated by the corresponding configuration file 118, 120, 122.

In 460, the user interface including the modified visual appearance of the first tile including the second selection of information may be provided upon receiving a confirmation of the move of the first tile to the section. For example, Launchpad 103 may be displayed with the display items rearranged to account for the increase/decrease of display space consumed by the moved display item (e.g., tile 106, 108, or link 112).

While TILPS 102 of FIG. 1 enables access to various applications 107, in some situations, different end users may have different requirements for an application. These requirements may be influenced by a user's specific context. For example, different geographic locations may customarily display calendar dates in different formats, a company may set a particular user interface layout for its employees, or managers within a company may have access to more detailed information than supporting employees.

In some situations, application vendors have worked to adapt applications based on region- or customer-specific needs by releasing multiple application versions for each specific context. For example, a first country may receive one version of an application, while a second country may receive another. This approach may not be optimal, as it may require teams of developers to separately develop and maintain each application version, creating disparate branches from the core application for each region- or customer-specific customization. When an update to the core application is needed, changes must be inefficiently propagated to each application version and properly tested. Changes to application dependencies must similarly be made for each application version and tested to ensure compatibility.

Figure 5:
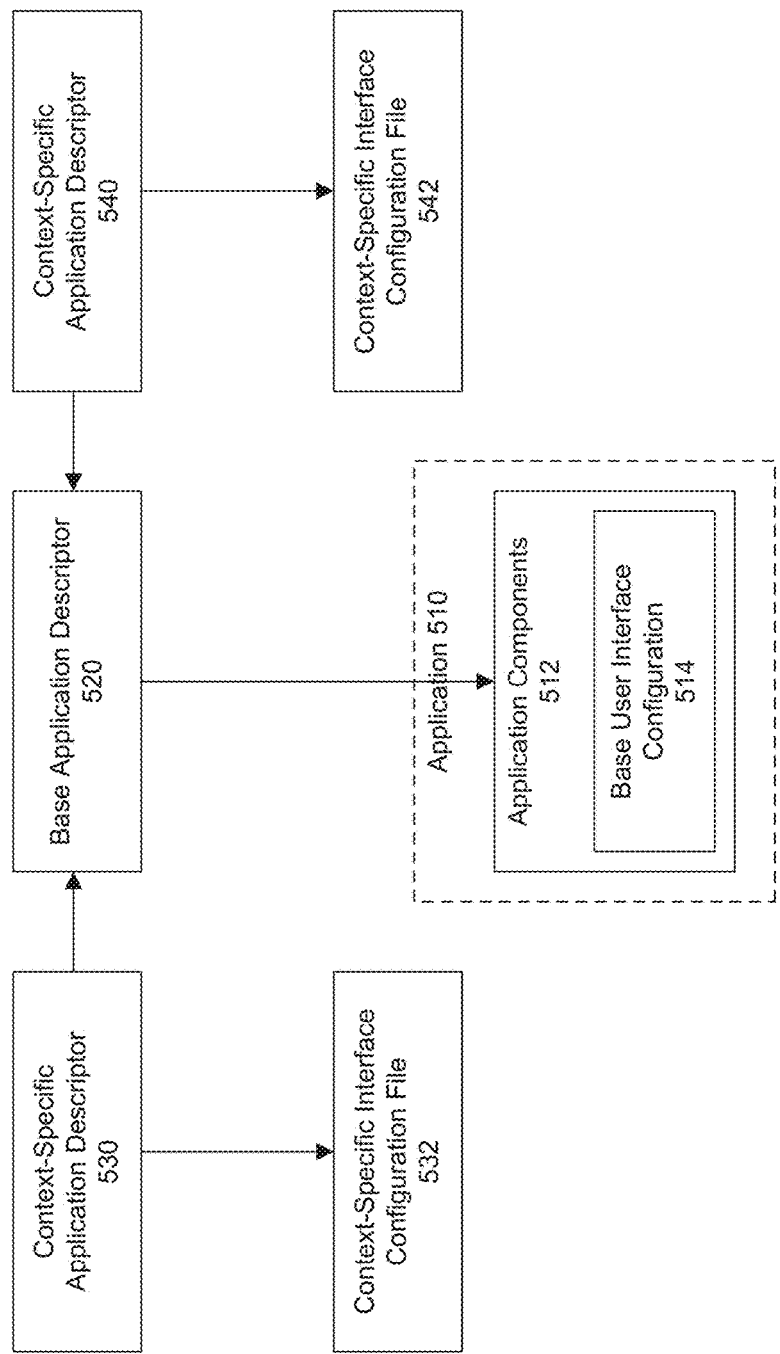
FIG. 5 is a block diagram illustrating an example data architecture supporting application variants, according to some embodiments.

FIG. 5 is a block diagram illustrating an example data architecture supporting application variants, according to some embodiments, which addresses the issues discussed above. In an embodiment, an application 510 may be made up of various application components 512 that provide the design and function of the application. For example, certain application objects may define the design and layout of the user interface for the application (e.g., base user interface configuration 514), while other objects may contain functional logic that defines behavior of the application.

In an embodiment, application 510 may be developed to provide the core and/or default design and function of the application that should be provided to users, regardless of the user's specific context. In this manner, application components 512 may include components developed specifically for application 510, components developed to be used across multiple applications, and third-party components that application 510 depends on and employs. Variants of the base application 510 may then be created to customize the application for particular users and contexts without affecting base application 510.

In an embodiment, base application 520 may represent application 510 and may include references to each of application components 512, including user interface components such as base user interface configuration 514, along with other metadata related to the application. Application descriptor may be used by TILPS 102 of FIG. 1 to interact with and load application 510.

Base application configuration 514 may define the user interface of application 510, including the elements or objects to display within the interface, the format of each element, the data to display within each element (e.g., data fields of a table object), and the screen layout of the elements. In an embodiment, base application configuration 514 may include display logic to adapt the user interface for display on different devices, such as a laptop, tablet, and mobile phone. Base application configuration 514 may be defined using any mark-up language, such as but not limited to, JSON, XML, or HTML.

When application 510 needs to be customized for a particular context, an application variant may be created. In an embodiment, the application variant includes a new context-specific application descriptor, such as context-specific application descriptors 530 and 540, and one or more interface configuration files for the application variant, such as interface configuration files 532 and 542. Context-specific application descriptors 530 and 540 are built on top of base application 510 with reference to the contents of base application descriptor 520. This enables updates to application 510 to be made without the need to update any application variants. For example, base application descriptor 520 may specify application dependencies, such as common libraries or interface components. Context-specific application descriptors 530 and 540 may reference the contents of base application descriptor 520, including application dependencies. Then, if a dependent component of application 510 is updated or replaced, the change will automatically be applied to application variants that reference base application descriptor 520. In this way, application variants depend on base application descriptor 520, and not underlying application components that may be changed or replaced. This drastically reduces the requirements for maintaining multiple application versions by allowing changes to be made in one place for all versions.

Application variants may be created for a variety of different contexts. In some embodiments, application variants may account for contextual parameters such as, but not limited to, a particular user of the application (user identity), a geographic or geopolitical location of the user (e.g., country or geographic region), a company or organization, an industry, a line of business, a usage type denoting intended use of the application (e.g., a particular transaction type selected by a user in TILPS 102 when launching an application), a device type used to access the application (e.g., laptop, phone), network connection details (e.g., connected to the application via local area network or remotely through the Internet), an application partner (e.g., a third-party application distributor and/or developer of enhancements (add-ons) to the base application), a user role, a security or permissions group that the user is a part of, and/or any combination thereof, to name just a few examples.

Each application variant may take into account one or more contextual parameters. For example, context-specific application descriptor 530 may be created with a location parameter of "United States" and a company parameter of "Example Company," while context-specific application descriptor 540 may be created with a user role parameter of "Administrator." Interface configuration file 532 may then define user interface details specific to users that are part of Example Company and are located in the United States, and interface configuration file 542 may define user interface details specific to administrator users of application 510. As will be discussed further below, when an administrative user in the United States from Example Company requests to access application 510, the two application variants may be merged with the base application to provide a context-specific user interface.

In an embodiment, application descriptors 520, 530, and 540, base user interface configuration 514, and context-specific interface configuration files 532 and 542 may be stored in a layered repository. In an embodiment, application descriptors 520, 530, and 540 may be given unique identifiers for efficient storage and access. The layered repository may be any type of structured or unstructured data store, such as a relational, document-oriented, or object-oriented database. In an embodiment, the layered repository may be partitioned into organizational layers, such as but not limited to, a vendor layer, a partner layer, a customer layer, a test layer, and a user layer. Each layer may be implemented as any logical storage subdivision, for example a memory partition, a database instance, a database schema or namespace, or a database table. The vendor layer may represent the original application developer and store base application files, such as base application descriptor 520 and base user interface configuration 514. The vendor layer may also store application variants (e.g., context-specific application descriptors and context-specific interface configuration files) related to, for example, geographic or geopolitical location and industry, as these may be created and managed by the original application developer. The partner layer may store application variants related to particular application enhancements created by an application partner. The customer layer may store application variants that customize the application for a particular company or organization. The test layer may store application variants used to test the application, for example interface configuration files that display debugging data within user interface elements. Finally, the user layer may store application variants related to preferences of an end-user of the application. This enables a user to customize the application without making any changes to the core implementation. In an embodiment, interface configuration files may be stored in more than one organizational layer.

The organizational layers of the layered repository provide a number of advantages for implementing and maintaining application variants. First access to data in the layered repository can be permissioned based on the organizational layers. For example, an application partner creating application enhancements may be authorized to write to the partner layer, but may be unable to modify a base application configuration residing in the vendor layer. Similarly, a company administrator may be authorized to create company-specific interface configuration files, but may be unable to modify partner or base application configurations. Second, the organizational layers may be used to define priorities for interface configuration files. For example, when a user requests to access an application, appropriate interface configuration files associated with the request (e.g., context-specific interface configuration files 532 and 542) may be merged with the base user interface configuration for the application (e.g., base user interface configuration 514), as will be discussed in more detail below. Layer priorities may define the order in which each configuration file is merged.

Figure 6:
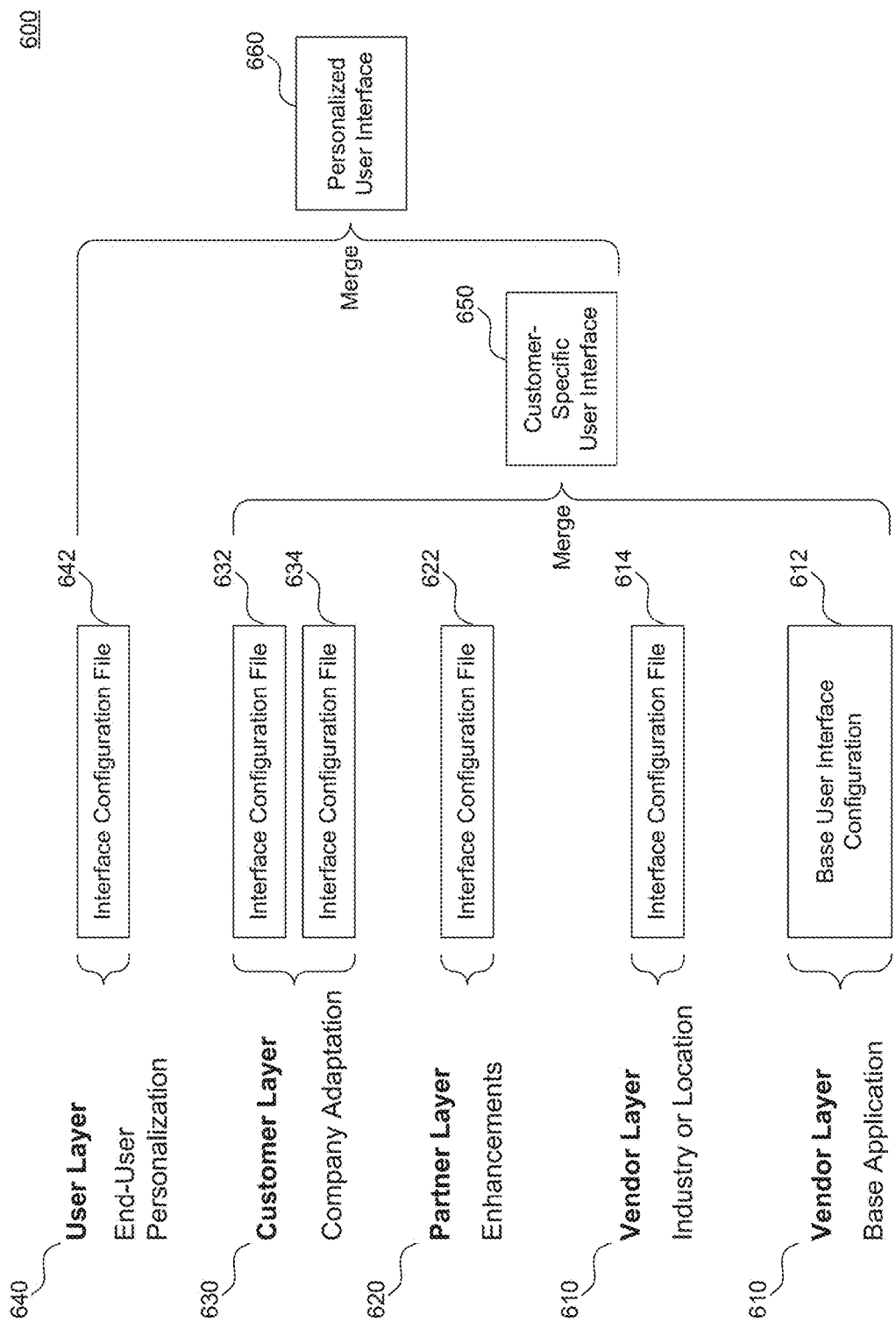
FIG. 6 is a block diagram illustrating user interface customization for an application, according to some embodiments.

FIG. 6 is a block diagram illustrating user interface customization for an application, according to some embodiments. In an embodiment, an end-user may request to access an application, for example via user interface 104 of FIG. 1. The request may include one or more contextual parameters that have either been entered by the user or determined automatically. Example contextual parameters may include the location of the user, enabled third-party add-ons to the application, a company where the user is employed, identification of the user, a user role within the company, and/or any combination thereof, to name just a few examples. These contextual parameter may be determined automatically, for example, via an authentication action of the user and a GPS or network connection of the user's device.

As discussed above, each contextual parameter may be associated with a context-specific application descriptor, which in turn may reference one or more interface configuration files. Each interface configuration file acts as a delta file, defining user interface configuration changes that can be applied on top of the base user interface configuration for the application. Upon receiving a request to access the application, each contextual parameter may be extracted and used to search the layered repository for a matching context-specific application descriptor. In an embodiment, the extracted contextual parameters may be in the form of identifiers for the corresponding context-specific application descriptors. The layered repository may then simply be searched for the context-specific application descriptor by identifier. Alternatively, the extracted contextual parameters may be plaintext values of the parameters (e.g., location="United States"). The contextual parameter value may then be matched to the corresponding context-specific application descriptor, for example by searching parameters stored within the each application descriptor or via an external mapping of parameter values to application descriptor identifiers.

Once the appropriate context-specific application descriptors have been located, interface configuration files corresponding to each application descriptor may be retrieved and merged with the base user interface configuration for the application. These merge operations may generate a composite interface configuration, applying changes in each context-specific interface configuration file to the base user interface configuration in order of a determined priority. In an embodiment, the composite interface configuration may be stored in the same format as the base user interface configuration and each context-specific interface configuration file, for example JSON, XML, or HTML.

In an embodiment, a merge operation may begin with the base user interface configuration and apply changes defined in the context-specific interface configuration file. For example, the base user interface configuration may include a product table element with data fields "ProductID" and "ProductName." The context-specific configuration file may further include the data field "Price." Following the merge operation, the composite interface configuration may include each of the three data fields. If multiple context-specific interface configuration files were retrieved, the file next in priority may then be merged with the current composite interface configuration. In this manner, priorities associated with interface configuration files may be used to resolve conflicts by applying the changes in the highest or lowest priority interface configuration files to the final composite interface configuration.

In an embodiment, context-specific interface configuration files may be assigned priorities based on the organizational layer of the layered repository in which they reside. The order of the organizational layers may be predetermined based on level of granularity and/or chain of application development. For example, as illustrated in FIG. 6, vendor layer 610 is the bottom layer within the layered repository and is assigned the lowest (or highest depending on perspective) priority. That is, interface configuration files residing within vendor layer 610 (e.g., interface configuration file 614) may be merged first with base user interface configuration 612. Vendor layer 610 is followed in priority (in order) by partner layer 620, customer layer 630, and user layer 640. Additionally or alternatively, priorities may be assigned directly to interface configuration files or within each organizational layer. For example, within customer layer 630, interface configuration files 632 and 634 may be assigned priorities automatically based on the date of creation or last modification, merging the most recent configuration changes last, or assigned priorities manually by a user or administrator.

In the example illustrated in FIG. 6, base user interface configuration 612 and interface configuration files 614, 622, 632, 634, and 642 have been retrieved based on a user request to access a particular application. In an embodiment, interface configuration file 614 may first be merged with base user interface configuration 612 to generate a temporary composite interface configuration. Interface configuration file 614 may customize the application user interface based on the specific industry or location associated with the end-user. Next, interface configuration file 622 may be merged with the temporary composite interface configuration to generate a new temporary composite interface configuration. Interface configuration 622 may customize the application user interface based on enabled application add-ons, such as display of data available from a third-party service.

Interface configuration files 632 and 634 may then be merged with the current composite interface configuration, applying changes defined in interface configurations 632 and 634 on top of the current composite interface configuration. As discussed above, interface configurations 632 and 634 may be merged in order of determined priorities, for example in order of the date of creation or last modification. Interface configurations 632 and 634 may customize the application user interface based on company-wide settings. For example, interface configuration file 634 may correspond to interface changes for the entire company, while interface configuration file 632 may correspond to interface changes for a specific user role within the company, such as a sales manager.

Once interface configurations 632 and 634 have been merged, a new composite interface configuration may be generated, shown as customer-specific user interface. This composite interface configuration represents the application user interface for a particular company before applying any end-user configuration. Finally, interface configuration file 642 may be merged with customer-specific user interface 650 to generate a final composite interface configuration, shown as personalized user interface 660. In an embodiment, user layer 640 may reside on a client device operated by the user, rather than within the layered repository.

In an embodiment, personalized user interface 660 may be generated and applied to the application at runtime. This allows the layered repository to store the interface configuration files within each organizational layer and generate composite interface configurations when an application is requested. The composite interface configurations may then be deleted when not in use. Alternatively, composite interface configurations may be generated in advance of a user requesting an application, for example when a tile corresponding to the application is displayed within user interface 104 of FIG. 1. This may enable quicker access to the application in exchange for greater storage requirements. In some embodiments, merge operations may be performed within the layered repository or a server communicatively coupled to the layered repository, such as TILPS 102. Alternatively, all or a portion of the merge operations may be performed on the client device operated by the user. For example, customer-specific user interface 650 may be provided to the client device, and the client device may merge interface configuration file 642 to generate the composite personalized user interface 660.

Figure 7:
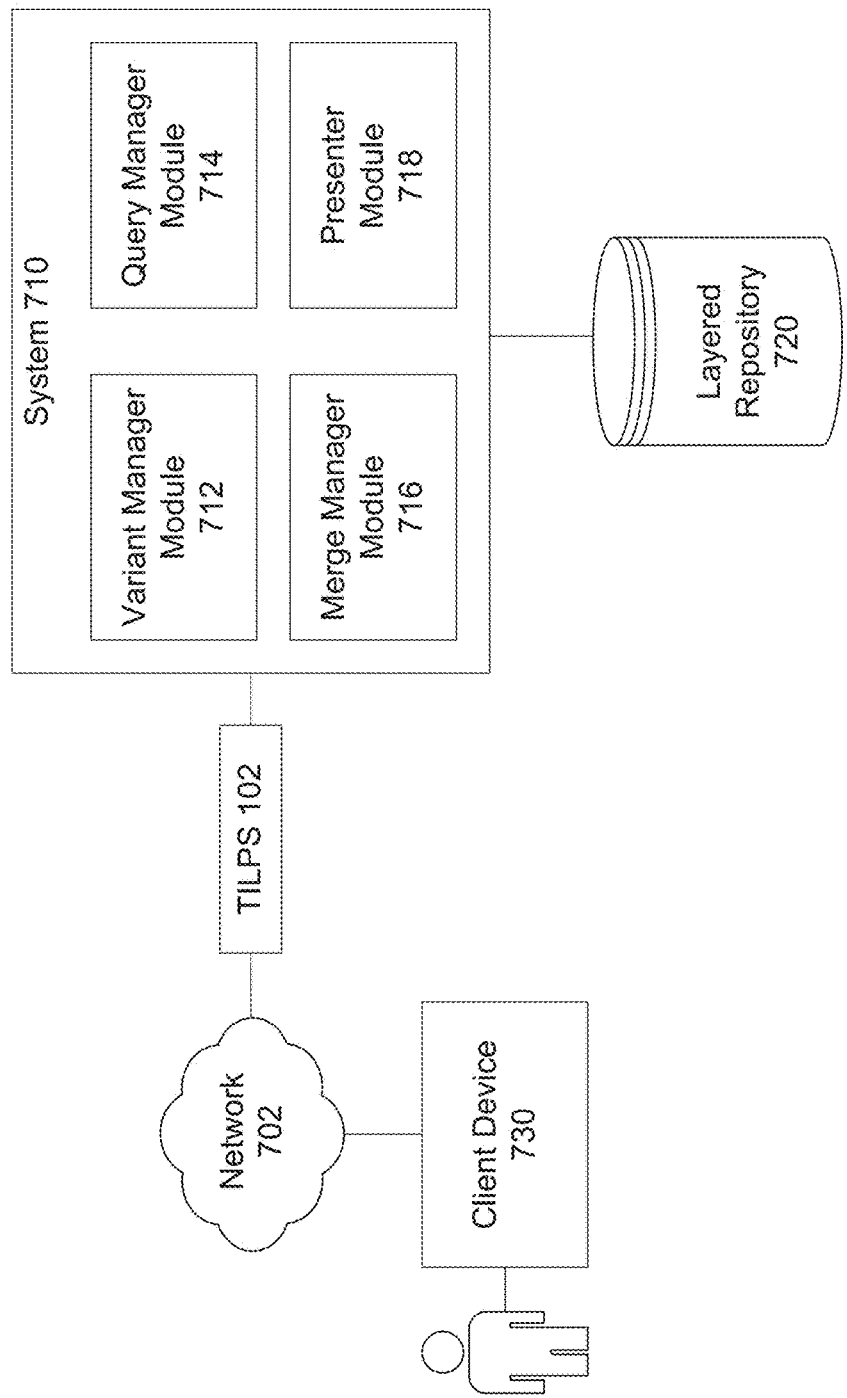
FIG. 7 is an example system for creating and accessing application variants, according to some embodiments.

FIG. 7 is an example system for creating and accessing application variants, according to some embodiments. Client device 730 may be any computing device, such as a laptop computer, desktop computer, netbook computer, tablet, smart phone, server computer, handheld device (e.g., dumb or smart phone, tablet, etc.), wearable device (e.g., eyeglasses, wrist watch, etc.), virtual reality (VR) or argument reality (AR) device (e.g., a VR/AR headset), in-vehicle infotainment system, gaming console, television set, media device, set-top box, global positioning system (GPS), printer, appliance, etc. Example computing devices are further described with respect to FIG. 9. Client device may be communicatively coupled to TILPS 102 via a network 702. Network 702 may be any type of computer network capable of communicating data, for example, a local area network or a wide-area network (e.g., the Internet), or any combination thereof.

In an embodiment, TILPS 102 is communicatively coupled to system 710. Alternatively, system 710 may be part of or reside within TILPS 102. System 710 may further be communicatively coupled to layered repository 720. Layered repository 720 may be any type of structured or unstructured data store, such as a relational, document-oriented, or object-oriented database. System 710 may include variant manager module 712, query manager module 714, merge manager module 716, and presenter module 718. It is to be appreciated that system 710 may include other components in addition to or in place of the components illustrated in FIG. 7 without departing from the scope and spirit of this disclosure.

Variant manager module 712 may enable creation and management of application variants, as discussed with respect to FIGS. 6 and 7 for example. In an embodiment, variant manager module 712 may provide authoring tools to assist with creation and modification of context-specific application descriptors and interface configuration files.

Query manager module 714 may receive and process requests from client device 730 to access an application, and interact with layered repository, as discussed with respect to FIGS. 6 and 7 for example. Query manager module 714 may write files to and retrieve files from layered repository 720 to aid in creation of and access to application variants.

Merge manager module 716 may perform merge operations of retrieved interface configuration files with a base user interface configuration to generate composite interface configurations, as discussed with respect to FIG. 6 for example. Presenter module 718 may apply a composite interface configuration to an application upon runtime of the application, as discussed with respect to FIG. 6. Presenter module 718 may further provide the application and customized user interface to client device 730.

Figure 8:
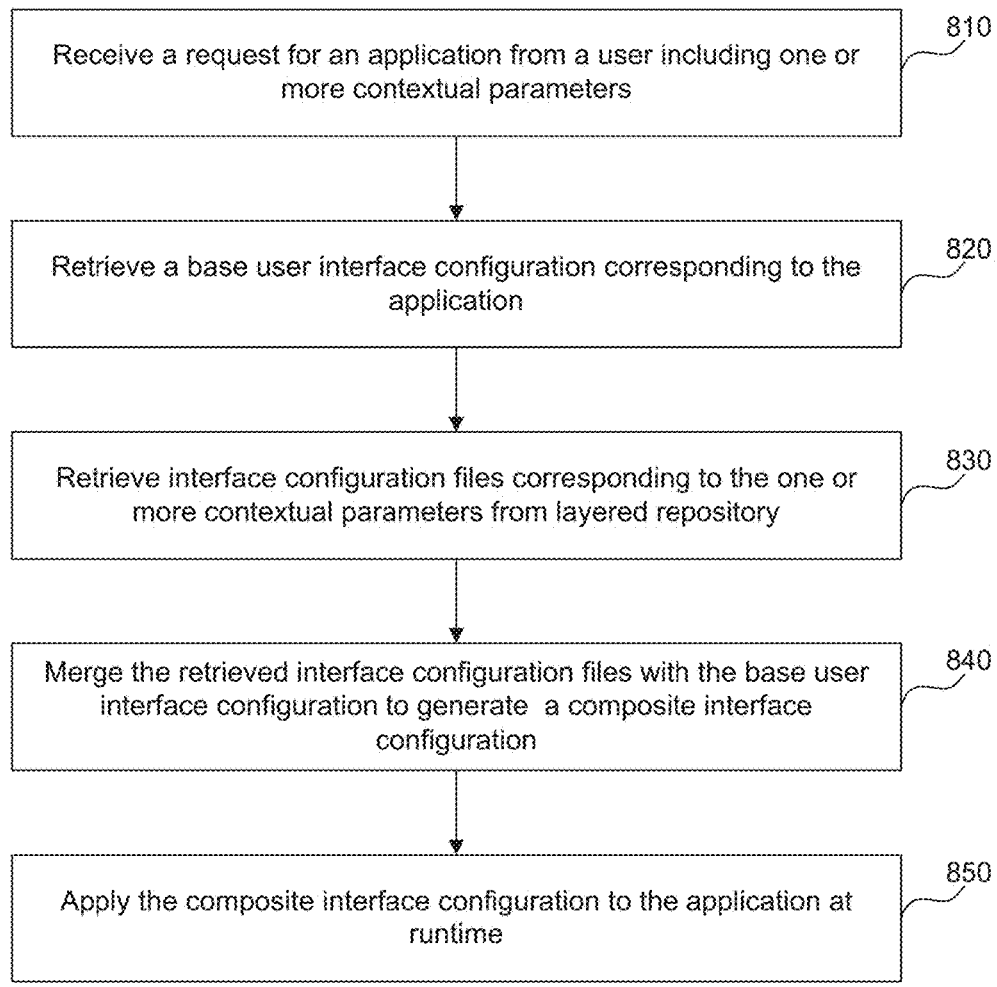
FIG. 8 is a flowchart illustrating an example process for requesting an application, according to some embodiments.

FIG. 8 is a flowchart illustrating an example method 800 for requesting an application, according to some embodiments. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art.

In 810, a request may be received for an application from a user including one or more contextual parameters. For example, a user may select to access an application from TILPS 102, as described with respect to FIG. 1 for example. Example contextual parameters may include the location of the user, enabled third-party add-ons to the application, a company where the user is employed, identification of the user, a user role within the company, and/or any combination thereof, to name just a few examples. These contextual parameter may be determined automatically, for example, via an authentication action of the user and a GPS or network connection of the user's device.

In 820, a base user interface configuration corresponding to the application may be retrieved. In an embodiment, the base user configuration is retrieved from a layered repository, such as layered repository 720 of FIG. 7. In 830, interface configuration files corresponding to the contextual parameters may be retrieved from the layered repository. As discussed above, each contextual parameter may be associated with a context-specific application descriptor, which in turn may reference one or more interface configuration files.

In 840, the retrieved interface configuration files may be merged with the base user interface configuration to generate a composite interface configuration. In an embodiment, a merge operation may begin with the base user interface configuration and apply changes defined in the context-specific interface configuration file. For example, the base user interface configuration may include a product table element with data fields "ProductID" and "ProductName." The context-specific configuration file may further include the data field "Price." Following the merge operation, the composite interface configuration may include each of the three data fields. If multiple context-specific interface configuration files were retrieved, the file next in priority may then be merged with the current composite interface configuration. In this manner, priorities associated with interface configuration files may be used to resolve conflicts by applying the changes in the highest or lowest priority interface configuration files to the final composite interface configuration. In some embodiments, interface configuration files may be merged in order of a predetermined priority corresponding to each organizational layer of the layered repository and/or in order of a determined priority corresponding to each configuration file.

Finally, in 850, the composite interface configuration may be applied to the application at runtime. That is, the end user may be provided with a user interface adapted for the user's particular context. In some embodiments, the composite interface configuration may also be generated at runtime of the application, or prior to runtime to enable quicker application access.

Figure 9:
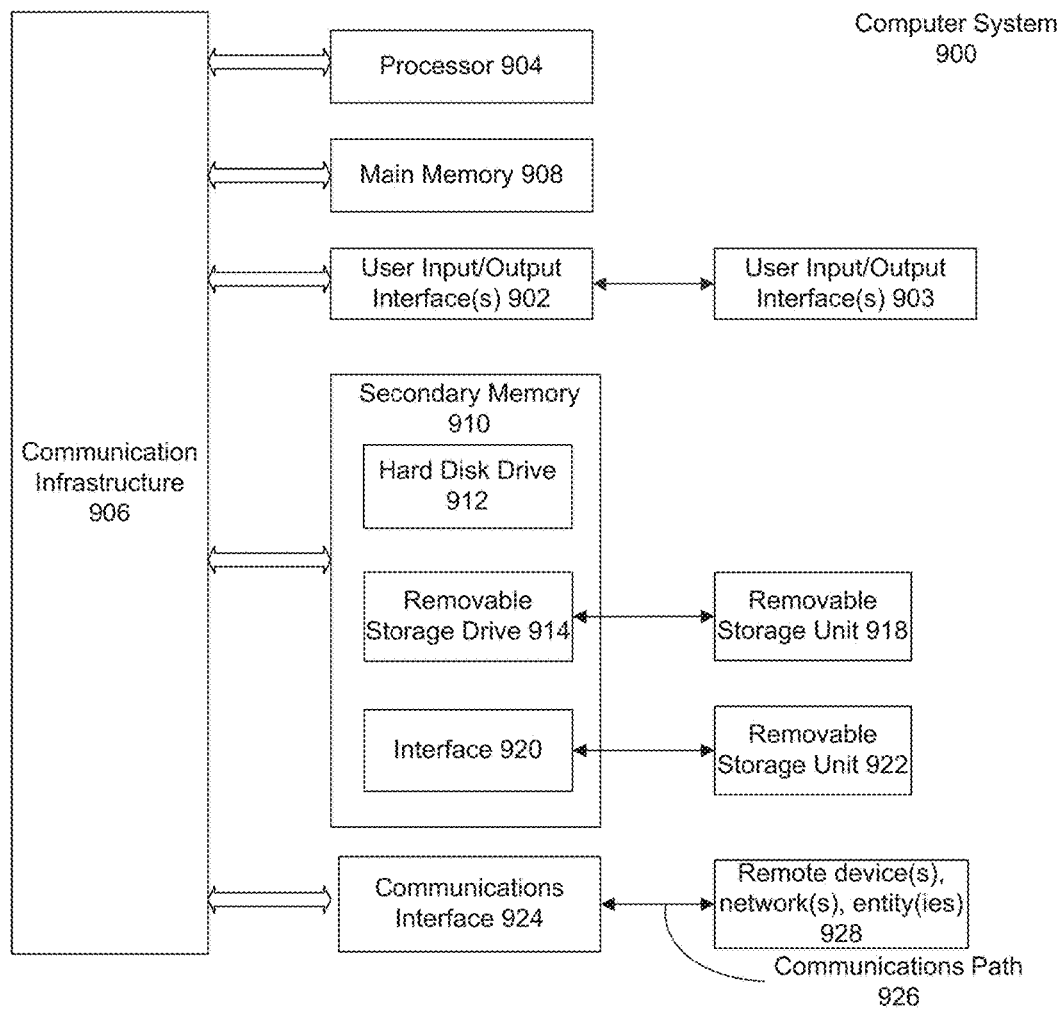
FIG. 9 is an example computer system useful for implementing various embodiments.

Various embodiments can be implemented, for example, using one or more computer systems, such as computer system 900 shown in FIG. 9. Computer system 900 can be used, for example, to implement the user interface 104 of FIG. 1 and/or the methods of FIGS. 4 and 8, and/or any of the structure and functionality depicted in FIGS. 1-8. Computer system 900 can be any computer capable of performing the functions described herein.

Computer system 900 can be any well-known computer capable of performing the functions described herein.

Computer system 900 includes one or more processors (also called central processing units, or CPUs), such as a processor 904. Processor 904 is connected to a communication infrastructure or bus 906.

One or more processors 904 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 908, such as random access memory (RAM). Main memory 908 may include one or more levels of cache. Main memory 908 has stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to an exemplary embodiment, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

In an embodiment, a tangible apparatus or article of manufacture comprising a tangible computer useable or readable medium having control logic (software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
receiving a request for an application, the request including contextual parameter data;
retrieving a base user interface configuration corresponding to the application;
automatically retrieving a first interface configuration file corresponding to the contextual parameter data from a first organizational layer of a layered repository, the layered repository partitioned into one or more organizational layers that store a plurality of interface configuration files associated with the application;
retrieving a second interface configuration file corresponding to the contextual parameter data from a second organizational layer of the layered repository, wherein the second organizational layer is a memory partition different from the first organizational layer and the second organizational layer utilizes write permissions that differ from the first organizational layer;
merging the first and second interface configuration files with the base user interface configuration by applying changes in the first and second interface configuration files to the base user interface configuration to generate a composite user interface configuration by:

merging the first interface configuration file with the base user interface configuration to generate a temporary composite interface configuration; and merging the second interface configuration file with the temporary composite interface configuration to generate the composite interface configuration, wherein the composite interface configuration includes user interface components from the first interface configuration file, the second interface configuration file, and the base user interface configuration; and applying the composite user interface configuration to the application at runtime.

2. The method of claim 1, wherein the retrieving the first interface configuration file further comprises:

matching the contextual parameter data to a context-specific application descriptor, wherein the context-specific application descriptor includes a reference to a base application descriptor corresponding to the application, and wherein the context-specific application descriptor includes a unique identifier; and retrieving the first interface configuration file corresponding to the context-specific application descriptor.

3. The method of claim 1, wherein the merging further comprises:

merging the first and second interface configuration files in order of a predetermined priority corresponding to the first and second organizational layer.

4. The method of claim 1, further comprising:

merging a third interface configuration file with a third interface configuration within the first organizational layer in order of a determined priority to generate the first interface configuration file.

5. The method of claim 1, wherein the contextual parameter data includes at least one of a user identification parameter associated with the user, a user location parameter, an industry parameter, a line of business parameter, a company parameter, a usage type parameter, a device type parameter, a network connection parameter, an application partner parameter, a user role parameter, and a security or permissions group parameter.

6. The method of claim 1, wherein the one or more organizational layers of the layered repository include at least one of a vendor layer, a partner layer, a customer layer, a test layer, and a user layer.

7. The method of claim 1, wherein the merging is performed at runtime of the application.

8. A system, comprising:

a memory; and at least one processor coupled to the memory and configured to:

receive a request for an application, the request including contextual parameter data;

retrieve a base user interface configuration corresponding to the application;

automatically retrieve a first interface configuration file corresponding to the contextual parameter data from a first organizational layer of a layered repository, the layered repository partitioned into one or more organizational layers that store a plurality of interface configuration files associated with the application;

retrieve a second interface configuration file corresponding to the contextual parameter data from a second organizational layer of the layered repository, wherein the second organizational layer is a memory partition different from the first organizational layer and the second organizational layer utilizes write permissions that differ from the first organizational layer;

merge the first and second interface configuration files with the base user interface configuration by applying changes in the first and second interface configuration files to the base user interface configuration to generate a composite user interface configuration by:

merging the first interface configuration file with the base user interface configuration to generate a temporary composite interface configuration; and merging the second interface configuration file with the temporary composite interface configuration to generate the composite interface configuration, wherein the composite interface configuration includes user interface components from the first interface configuration file, the second interface configuration file, and the base user interface configuration; and apply the composite user interface configuration to the application at runtime.

9. The system of claim 8, wherein the at least one processor is further configured to:

match the contextual parameter data to a context-specific application descriptor, wherein the context-specific application descriptor includes a reference to a base application descriptor corresponding to the application, and wherein the context-specific application descriptor includes a unique identifier; and retrieve the first interface configuration file corresponding to the context-specific application descriptor.

10. The system of claim 8, wherein the at least one processor is further configured to:

merge the first and second interface configuration files in order of a predetermined priority corresponding to the first and second organizational layer.

11. The system of claim 8, wherein the at least one processor is further configured to:

merge a third interface configuration file with a third interface configuration within the first organizational layer in order of a determined priority to generate the first interface configuration file.

12. The system of claim 8, wherein the contextual parameter data includes at least one of a user identification parameter associated with the user, a user location parameter, an industry parameter, a line of business parameter, a company parameter, a usage type parameter, a device type parameter, a network connection parameter, an application partner parameter, a user role parameter, and a security or permissions group parameter.

13. The system of claim 8, wherein the one or more organizational layers of the layered repository include at least one of a vendor layer, a partner layer, a customer layer, a test layer, and a user layer.

14. The system of claim 8, wherein the at least one processor is further configured to merge the one or interface configuration files with the base user interface configuration at runtime of the application.

15. A non-transitory computer-readable storage device having instructions stored thereon that, when executed by at least one computing device, causes the at least one computing device to perform operations comprising:

receiving a request for an application, the request including contextual parameter data;

retrieving a base user interface configuration corresponding to the application;

automatically retrieving a first interface configuration file corresponding to the contextual parameter data from a first organizational layer of a layered repository, the layered repository partitioned into one or more organizational layers that store a plurality of interface configuration files associated with the application;

retrieving a second interface configuration file corresponding to the contextual parameter data from a second organizational layer of the layered repository, wherein the second organizational layer is a memory partition different from the first organizational layer and the second organizational layer utilizes write permissions that differ from the first organizational layer;

merging the first and second interface configuration files with the base user interface configuration by applying changes in the first and second interface configuration files to the base user interface configuration to generate a composite user interface configuration by:

merging the first interface configuration file with the base user interface configuration to generate a temporary composite interface configuration; and merging the second interface configuration file with the temporary composite interface configuration to generate the composite interface configuration, wherein the composite interface configuration includes user interface components from the first interface configuration file, the second interface configuration file, and the base user interface configuration; and applying the composite user interface configuration to the application at runtime.

16. The non-transitory computer-readable storage device of claim 15, wherein to retrieve the first interface configuration file the operations further comprise:

matching the contextual parameter data to a context-specific application descriptor, wherein the context-specific application descriptor includes a reference to a base application descriptor corresponding to the application, and wherein the context-specific application descriptor includes a unique identifier; and retrieving the first interface configuration file corresponding to the context-specific application descriptor.

17. The non-transitory computer-readable storage device of claim 15, the operations further comprising:

merging the first and second interface configuration files in order of a predetermined priority corresponding to the first and second organizational layer.

18. The non-transitory computer-readable storage device of claim 15, the operations further comprising:

merging a third interface configuration file with a third interface configuration within the first organizational layer in order of a determined priority to generate the first interface configuration file.

19. The non-transitory computer-readable storage device of claim 15, wherein the contextual parameter data includes at least one of a user identification parameter associated with the user, a user location parameter, an industry parameter, a line of business parameter, a company parameter, a usage type parameter, a device type parameter, a network connection parameter, an application partner parameter, a user role parameter, and a security or permissions group parameter.

20. The non-transitory computer-readable storage device of claim 15, wherein the one or more organizational layers of the layered repository include at least one of a vendor layer, a partner layer, a customer layer, a test layer, and a user layer.

* * * * *